(12) United States Patent
Sun et al.

(10) Patent No.: US 7,489,469 B2
(45) Date of Patent: Feb. 10, 2009

(54) EMBEDDED RUNOUT CORRECTION BASED ON WRITTEN-IN RUNOUT MEASUREMENT

(75) Inventors: Yu Sun, Fremont, CA (US); Don Brunnett, Pleasanton, CA (US); Lloyd Levy, San Jose, CA (US); Thomas O. Melrose, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/724,436

(22) Filed: Mar. 15, 2007

(65) Prior Publication Data

US 2007/0297088 A1 Dec. 27, 2007

Related U.S. Application Data (60) Provisional application No. 60/782,909, filed on Mar. 15, 2006.

(51) Int. Cl.
*G11B 5/596* (2006.01)
(52) U.S. Cl. .................. 360/77.04; 360/75
(58) Field of Classification Search ........ None
See application file for complete search history.

(56) References Cited

U.S. PATENT DOCUMENTS

| 6,115,203 | A | 9/2000 | Ho et al. | |
| 6,549,362 | B1 | 4/2003 | Melrose et al. | |
| 6,965,491 | B1 | 11/2005 | Pearlmutter et al. | |
| 7,054,096 | B1 | 5/2006 | Sun et al. | |
| 7,106,547 | B1 | 9/2006 | Hargarten et al. | |
| 7,149,048 | B1 * | 12/2006 | Ray et al. | 360/77.04 |
| 7,161,759 | B1 | 1/2007 | Zhang et al. | |
| 7,167,336 | B1 * | 1/2007 | Ehrlich et al. | 360/77.04 |
| 2003/0184908 | A1 * | 10/2003 | Hsin | 360/77.04 |
| 2005/0128634 | A1 * | 6/2005 | Schmidt | 360/77.04 |

* cited by examiner

*Primary Examiner*—Jason C Olson
(74) *Attorney, Agent, or Firm*—Myers Bigel Sibley & Sajovec (57) ABSTRACT

Performing embedded runout correction for a track on a rotational data storage disk includes measuring written-in runout for the track, selecting a number of revolutions in response to the measured written-in runout of the track, calculating embedded correction values for the track for the selected number of revolutions of the rotational data storage disk, and storing the embedded correction values.

21 Claims, 12 Drawing Sheets

EMBEDDED RUNOUT CORRECTION BASED ON WRITTEN-IN RUNOUT MEASUREMENT

RELATED APPLICATION

This application claims the benefit of and priority to U.S. Provisional Patent Application Ser. No. 60/782,909, filed Mar. 15, 2006, the disclosure of which is hereby incorporated herein by reference as if set forth in its entirety.

FIELD

The present invention generally relates to servo systems and, more particularly, to controlling runout in a servo control system.

BACKGROUND

Computer disk drives store information on disks or platters. Typically, the information is stored on each disk in concentric tracks. The data tracks are usually divided into sectors. Information is written to and read from a storage surface(s) of a disk by a transducer. The transducer may include a read element separate from a write element, or the read and write elements may be integrated into a single read/write element. The transducer is mounted on an actuator arm capable of moving the transducer radially over the disk. Accordingly, the movement of the actuator arm allows the transducer to access different data tracks.

The disk is rotated by a spindle motor at a high speed, allowing the transducer to access different sectors within each track on the disk. The actuator arm is coupled to a motor or coarse actuator, such as a voice coil motor (VCM), to move the actuator arm such that the transducer moves radially over the disk. Operation of the coarse actuator is controlled by a servo control system. The servo control system generally performs two distinct functions: seek control and track following. The seek control function includes controllably moving the actuator arm such that the transducer is moved from an initial position to a target track position.

In general, the seek function is initiated when a host computer associated with the disk drive issues a command to read data from or write data to a target track on the disk. Once the transducer has been moved sufficiently close to the target track by the seek function of the control system, the track following function of the servo control system is activated to center and maintain the transducer on the target track until the desired data transfers are completed.

The track following function of the servo control system generally includes maintaining the transducer at a desired position with respect to a track being followed (e.g., over a centerline of the track). Typically, the transducer must be moved slightly during track following to maintain a desired position over the track. This is because, due to various factors, the track may appear to move beneath the transducer. There are numerous outside influences which can make it difficult for the servo control system to maintain the desired position over the track, one such influence is known as "runout."

Runout generally refers to deviation from perfect circular motion and, more particularly, refers to variation in the distance between an external point of reference and a passing surface of a rotating object. "Repeatable runout" involves periodic deviations that occur with predictable regularity (hereafter "RRO"). "Nonrepeatable runout" involves random perturbations due, for example, to bearing slop, shock events, and so on (hereafter NRRO). In the context of a disk drive, RRO is "repeatable" because it occurs in sync with the spinning disk. RRO may be caused by one or more of the following mechanical sources: a) spindle motor runout; b) disk slippage; c) disk warping; d) disturbances converted to RRO during a servo writing process due to, for example, NRRO, vibrations, resonances, media defects, or disk distortion due to clamping of the disk. RRO may also be caused by electromagnetic imperfections due to low quality servo positioning bursts, even if they were mechanically recorded on the ideal circle. Such low quality servo positioning bursts can yield incorrect position information.

In an ideal disk drive system, the tracks of the data storage disk are written as non-perturbed circles situated about the center of the disk. As such, each of these ideal tracks includes a track centerline that is located at a known constant radius from the disk center. In an actual system, however, it is difficult to write non-perturbed circular tracks to the data storage disk. That is, due to the problems mentioned above (e.g., vibration, bearing defects, etc.), tracks are generally written differently from the ideal non-perturbed circular track shape.

The writing of non-perturbed circular tracks is especially problematic when partial self-servo writing. That is, when servo data from a prior-written track on the disk surface is used by the disk drive's transducer to write servo data for a subsequent track on the disk surface, the track misplacement may be compounded from track-to-track.

In order to reduce problems associated with track misplacement, disk drive manufacturers have developed techniques to determine the track misplacement, so that compensation values (also known as embedded runout correction values or ERC values) may be generated and used to position the transducer along an ideal track centerline.

SUMMARY

Performing embedded runout correction for a track on a rotational data storage disk includes measuring written-in runout for the track, selecting a number of revolutions in response to the measured written-in runout of the track, calculating embedded correction values for the track for the selected number of revolutions of the rotational data storage disk, and storing the embedded correction values.

Some embodiments provide methods that include measuring written-in runout of a track including servo control fields, selecting a number of passes in response to the measured written-in runout of the track, calculating embedded correction values for the track for the selected number of passes over the track, and storing the embedded correction values.

A servo control system according to some embodiments includes a data storage media with a track defined thereon, a transducer configured to read data from the track and write data to the track, and a controller. The controller controls a position of the transducer relative to the track in response to embedded correction values in the track, wherein the embedded correction values are based on an embedded runout correction calculation performed for a number of passes selected in response to a written-in runout of the track.

DETAILED DESCRIPTION

The present invention now will be described more fully hereinafter with reference to the accompanying drawings, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
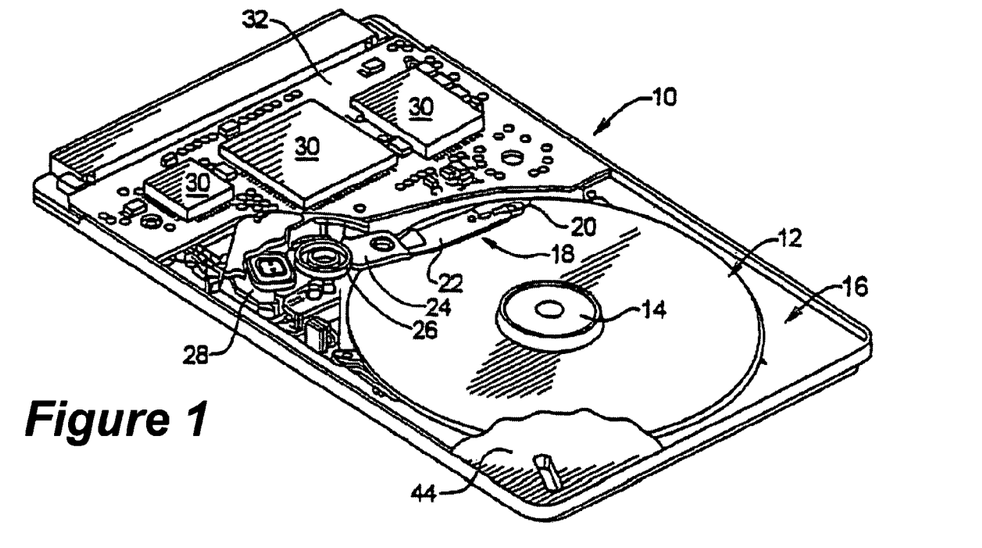
FIG. 1 is a perspective view of a disk drive that is configured in accordance with some embodiments.
Figure 2:
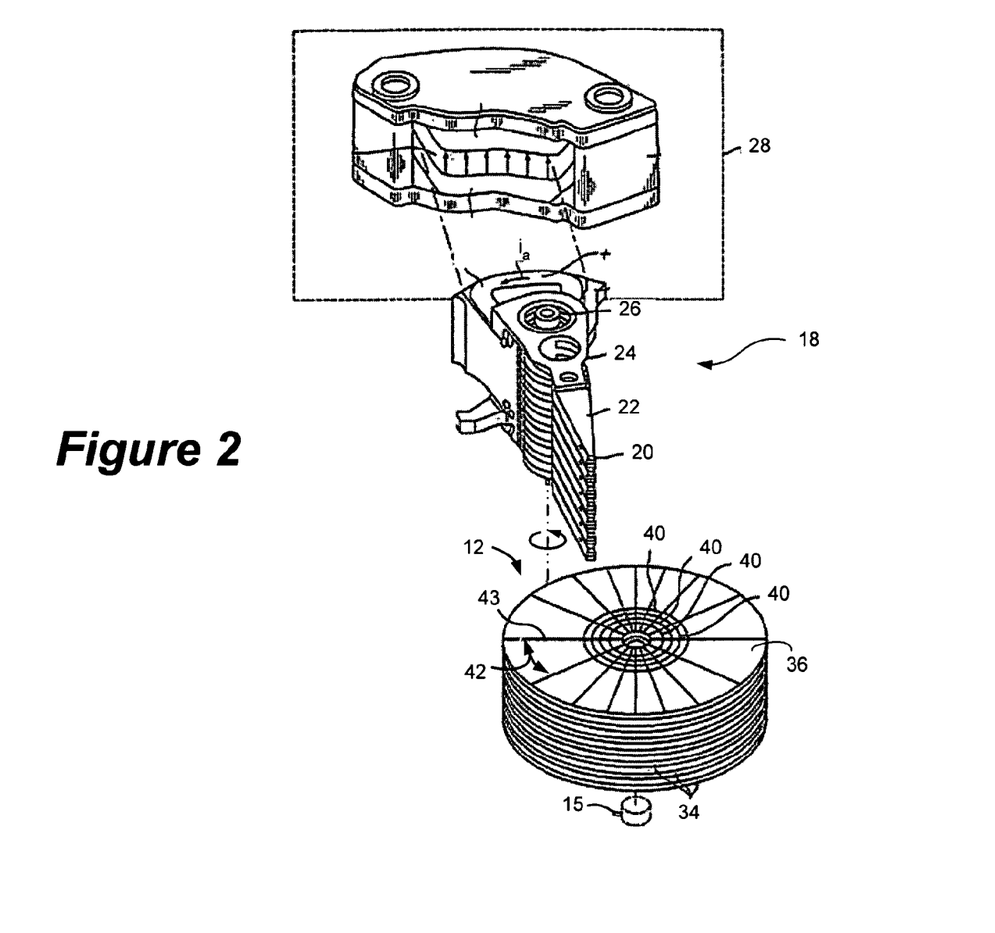
FIG. 2 is an exploded perspective diagram of a disk stack having a plurality of data storage disks along with an actuator assembly.

A simplified diagrammatic representation of a disk drive, generally designated as 10, is illustrated in FIG. 1. The disk drive 10 includes a disk stack 12 (illustrated as a single disk in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of sectors 42 separated by radially extending spokes 43. Each sector 42 is further divided into a servo sector 42a and a data sector 42b. The servo sectors of the disks 34 are used, among other things, to accurately position the head 20 so that data can be properly written onto and read from a selected one of the disks 34. The data sectors are where non-servo related data (i.e., host device data) is stored and retrieved.

Figure 3:
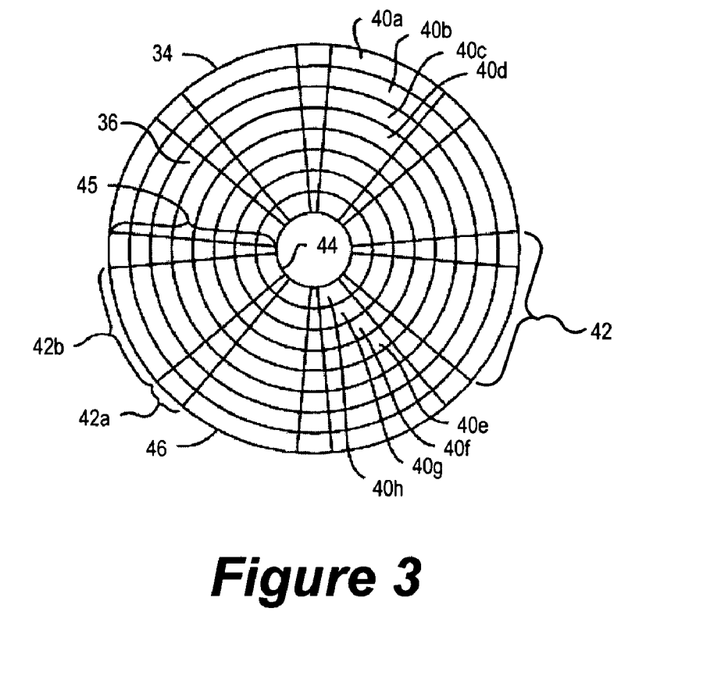
FIG. 3 is a plan view of a disk including a plurality of tracks including servo sectors and data sectors.

FIG. 3 is a simplified diagrammatic representation of a top view of a disk 34 having a surface 36 which has been completely formatted to be used in conjunction with a sectored servo system (also known as an embedded servo system). As illustrated in FIG. 3, the disk 34 includes a plurality of concentric tracks 40a-40h for storing data on the disk's surface 36. Although FIG. 3 only shows a relatively small number of tracks for ease of illustration, it should be appreciated that typically tens of thousands of tracks are included on the surface 36 of a disk 34.

Each track 40a-40h is divided into a plurality of servo sectors 42a and a plurality of data sectors 42b. The servo sectors 42a in each track 40 are radially aligned with servo sectors 42a in the other tracks, thereby forming servo wedges 45 which extend radially across the disk 34 (e.g., from the disk's inner diameter 44 to its outer diameter 46).

Instead of writing all of the radially-aligned servo information which forms servo wedges 45 using a servo track writer, partial self-servo writing techniques have been developed in an effort to format a disk surface, while reducing the amount of time required by the servo track writer. Accordingly, partial self-servo writing techniques are used in an attempt to obtain a disk surface formatted similar to the disk surface 36 shown in FIG. 3.

Figure 4A:
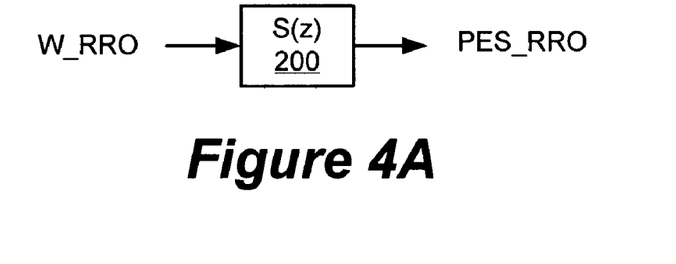
FIGS. 4A and 4B are block diagrams that illustrate the relationship between position error signal (PES) and W_RRO for a particular track.
Figure 4B:
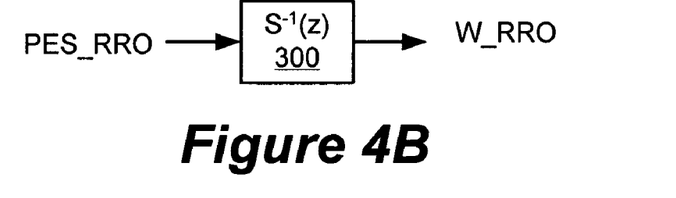

Actual track misplacement, or written-in repetitive runout (W_RRO) is related to a position error signal (PES) due to repeatable runout (PES_RRO) by a predetermined transfer function S(z) 200, as illustrated in FIG. 4A. The transfer function 200, in general, describes how the servo control system reacts to and follows the perturbed track. That is, W_RRO is the stimulus and PES_RRO is the response. As illustrated in FIG. 4B, in order to determine W_RRO values using PES_RRO values, the inverse transfer function $S^{-1}(z)$ 300 may be determined and the PES_RRO values may be convolved therewith.

The inverse transfer function $S^{-1}(z)$ 300 may be determined using a variety of techniques, such as those described in U.S. Pat. Nos. 6,115,203 and 6,549,362.

PES_RRO values may be determined by taking position error signal measurements while track following and averaging the position error for each servo sector associated with the track for multiple revolutions of the disk (e.g., 8 revolutions). As will be understood by those skilled in the art, the position error may be averaged over multiple revolutions of the disk, so that the affects of non-repeatable runout may be averaged out.

The result of the convolution operation is the W_RRO (see FIG. 4B). The W_RRO values associated with each servo sector may then be used to determine compensation values (i.e. embedded runout correction values, or ERC values) for each servo sector of the track. The embedded runout correction values (ERC values) are then written to an embedded runout correction field (ERC field) included as part of the data stored in each of the servo sectors.

During normal operation of the disk drive, the transducer 20 reads the ERC value stored in each servo sector 42a of a desired track 40. The ERC value is then used to modify the position error signal associated with a servo sector to cancel the offset between the non-ideal track (i.e., the track that was written onto the disk surface) and an ideal track, so that the transducer 20 (approximately) follows the ideal track. For example, the ERC value for a sector may be subtracted from a position error signal value read by the transducer 20 for the sector to obtain a modified position error signal value. The modified position error signal value may then be applied in generating a control signal for operating an actuator 28 to position the transducer 20.

Figure 5:
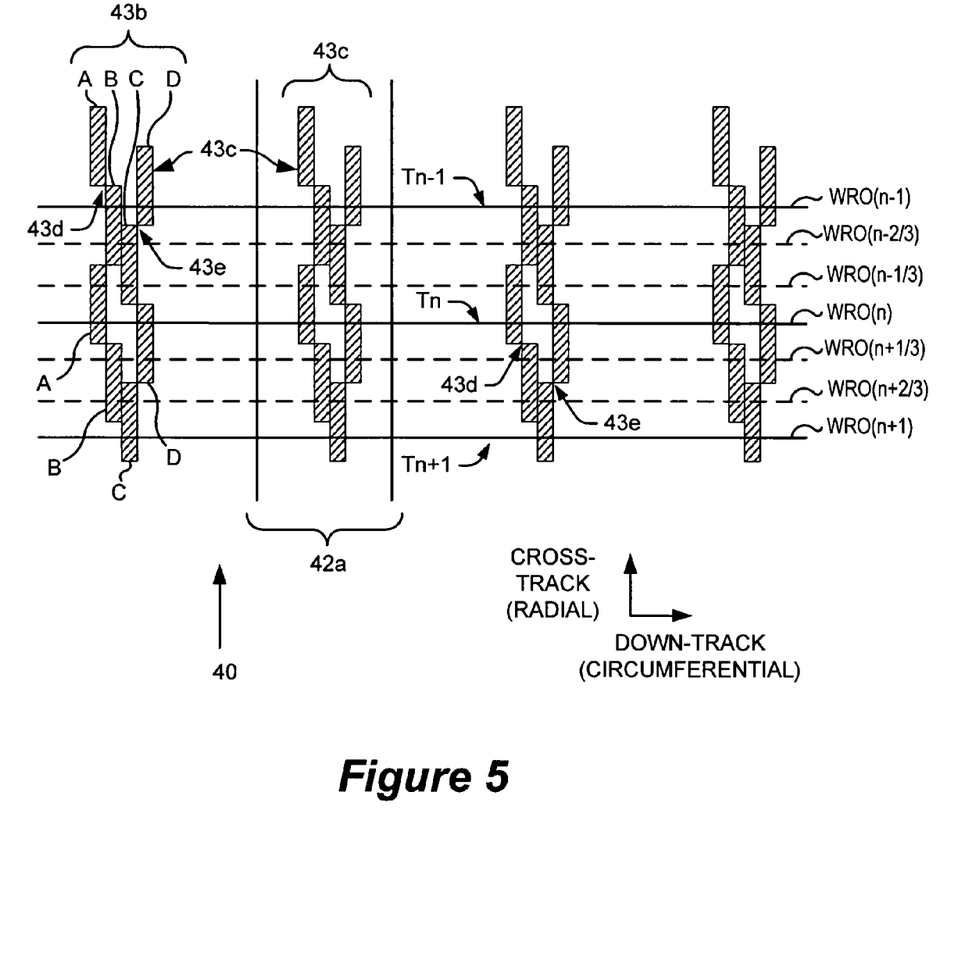
FIG. 5 illustrates example servo bursts in servo wedges of the servo pattern shown in FIG. 3.

FIG. 5 illustrates servo patterns on a disk surface 36. As shown in FIG. 5, the servo information includes servo burst patterns 43c in servo wedges 42a that form essentially radial servo spokes around the disk 34. Although the disk 34 is illustrated as having a relatively small number of the tracks 40 and servo wedges 42a, it can be appreciated that a typical disk includes a very large number of tracks and servo wedges.

FIG. 5 illustrates portions of the tracks 40 laid out linearly in a down-track 9 (circumferential) direction from left to right, and in a cross-track (radial) direction from top to bottom. Three centerlines Tn−1, Tn and Tn+1 of three tracks 40 are defined by multiple servo wedges 42a on each track 40. Each servo wedge 42a begins with digital information (e.g., AGC, sync mark, gray code, etc.) (not shown) and circumferentially sequential, radially offset servo bursts 43c which provide analog information to the servo controller for positioning the head 20. In this example, in each servo wedge 42a, the servo bursts 43c are four staggered A, B, C and D bursts. The servo wedge 42a can include further information following the servo bursts 43c as described below. Other numbers of servo bursts and offset configurations are also possible. In this example, the A, B bursts form a burst pair and the C, D bursts form another burst pair. The AC squeeze and the DC squeeze are not to be confused with the A, B, C and D bursts or the burst seams thereof.

During servo writing, the head 20 is positioned to write the A burst, then the head 20 is moved radially by ⅔ track width to write the B burst in a next revolution of the disk 34, thereby trimming off the bottom edge of the A burst and defining a burst seam (transition) 43d between the A burst and the B burst. Thus, the A burst is written in a first revolution of the disk 34, and then the A burst is trimmed when writing the B burst in a second revolution of the disk 34, thereby creating position information in the second revolution of the disk 34 by the trim/write operation. A different pair of revolutions of the disk 34 create the position information for the C, D burst pair. The C burst is written first, and then in a different revolution of the disk 34 the D burst is written, thereby trimming the edge of the C burst and forming another burst seam 43e between the C burst and the D burst. As such, in a pair of revolutions of the disk 34 the A, B burst pair and the burst seam 43d are written, and in a different pair of revolutions of the disk 34 the C, D burst pair and the burst seam 43e are written.

The motion of the head 20 from the servo writer defines where the burst seams 43d and 43e occur. Since the head 20 has non-repeatable motion, the difference in position for the burst seam 43d and the burst seam 43e captures the non-repeatable runout (NRRO) written into the A, B and C, D burst pairs as the AC squeeze. Therefore, NRRO is captured/written during servo writing and is different from revolution-to-revolution of the disk 34, and the burst seams 43d and 43e are written with the AC squeeze.

If the head 20 is placed at the burst seam 43d, the readback signal of the head 20 includes half the signal value of the A burst and half the signal value of the B burst. If the head 20 is shifted towards the A burst, the magnitude of the A burst readback signal increases and the magnitude of the B burst readback signal decreases, thereby providing the head 20 position information. The same readback signals and position information apply to the C, D burst pair. The A, B and C, D burst pairs are shifted in position from each other by a fraction of the track width, such as ⅓ track width in this example.

To determine squeeze for a track 40, the seam misplacement, which is also referred to herein as the written-in runout (WRO) for each servo wedge 42a in the track 40 is determined at multiple positions (e.g., the track centerline, and ⅓ and ⅔ track width positions relative to the track centerline). WRO measurement is described in detail, for example, in U.S. Pat. No. 6,965,491. Preferably the WRO measurement is essentially performed at every track location where a valid position measurement can be obtained. In this example, the track centerlines are selected at new norm/quad positions using the A, B, C and D bursts, and when the head 20 is positioned on a track centerline, the servo controller drives |A−B|=|C−D| regardless of the values of |A−B| or |C−D|.

If within a given range of the tracks 40 the written track width is essentially constant and the track spacing is uniform, then the value |A−B| should be essentially constant over each track 40 at the signal cross-overs. Similarly the value |C−D| should be essentially constant over each track 40 at the signal cross-overs. Reduced track spacing reduces the values |A−B| and |C−D| in the servo wedge 42a at the signal cross-overs relative to other tracks 40.

In generating the PES, depending on the location of the head 20 relative to the track centerline, different track modes based on combinations of the burst difference values may be used. Determining the PES and the corresponding WRO based on the track mode for the four burst servo pattern is based on the following relations:

$$PES1 = f[(A-B)-(C-D)] \tag{1a}$$

$$WRO1 = f[(A-B)+(C-D)] \tag{1b}$$

$$PES2 = f[-(A-B)-(C-D)] \tag{2a}$$

$$WRO2 = f[(A-B)-(C-D)] \tag{2b}$$

$$PES3 = f[-(A-B)+(C-D)] \tag{3a}$$

$$WRO3 = f[-(A-B)-(C-D)] \tag{3b}$$

$$PES4 = f[(A-B)+(C-D)] \tag{4a}$$

$$WRO4 = f[-(A-B)+(C-D)] \tag{4b}$$

where each PES and corresponding WRO is a function ($f$) of combinations of the A−B and C−D values.

Referring back to FIG. 5, in the above relations, PES1 and WRO1 correspond to the head 20 position at a track centerline (e.g., Tn−1). PES2 and WRO2 correspond to the head 20 position at ⅓ track width from the track centerline. PES3 and WRO3 correspond to the head 20 position at ⅔ track width from the track centerline. And, PES4 and WRO4 correspond to the head 20 position at the adjacent track centerline (e.g., Tn).

FIGS. 6A-6C and 7A-7C shows additional plots in which the horizontal axis (X) indicates the radial track position and the vertical axis (Y) indicates the signal amplitude.

Figure 6A:
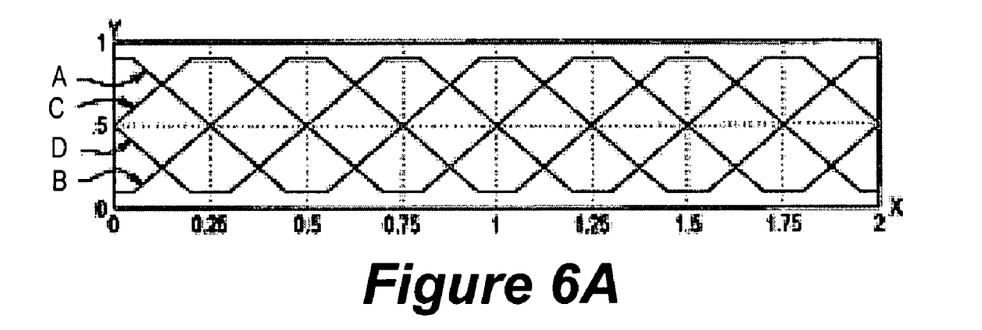
FIGS. 6A-6C are graphs of example burst signal values, burst difference signal values, and PES and WRO values, respectively, for a track having proper spacing.
Figure 6B:
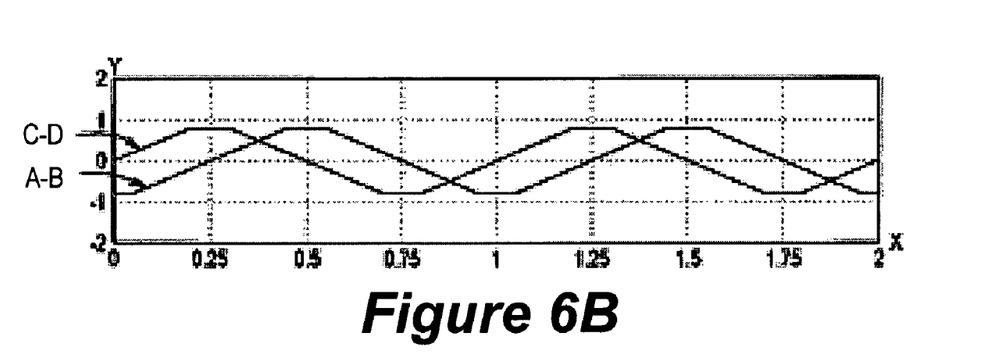
Figure 6C:
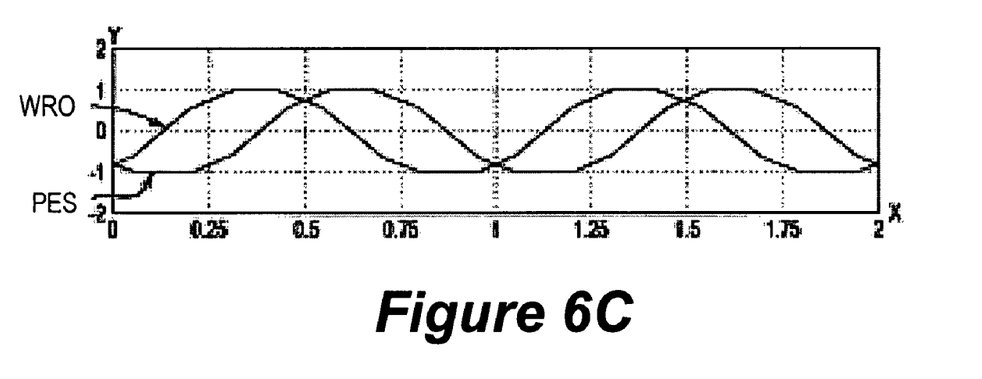

FIG. 6A shows plots of the signal values for the A, B, C and D bursts for a track without squeeze. FIG. 6B shows plots of the burst difference values A−B and C−D. FIG. 6C shows plots of PES=[(A−B)−(C−D)]g and WRO=[(A−B)+(C−D)]g. In some embodiments, g is a constant determined by a linearizer algorithm (there are different values of two-burst and four-burst calculations).

Figure 7A:
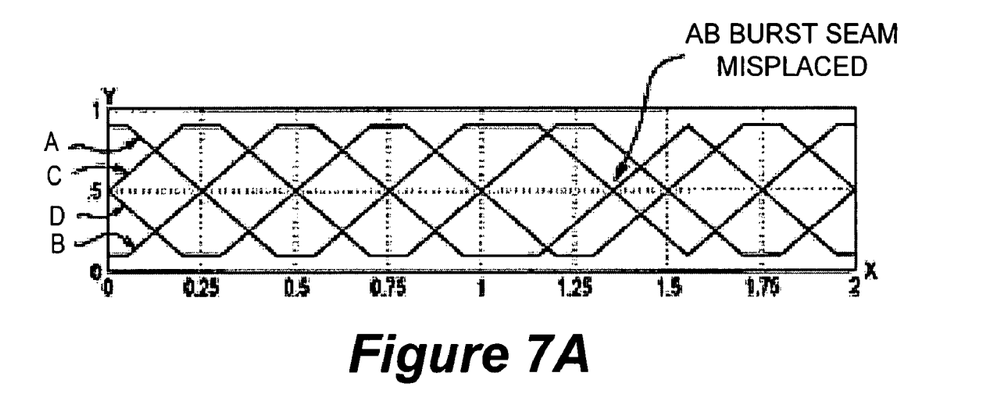
FIGS. 7A-7C are graphs of example burst signal values, burst difference signal values, and PES and WRO values, respectively, for a track having improper spacing.
Figure 7B:
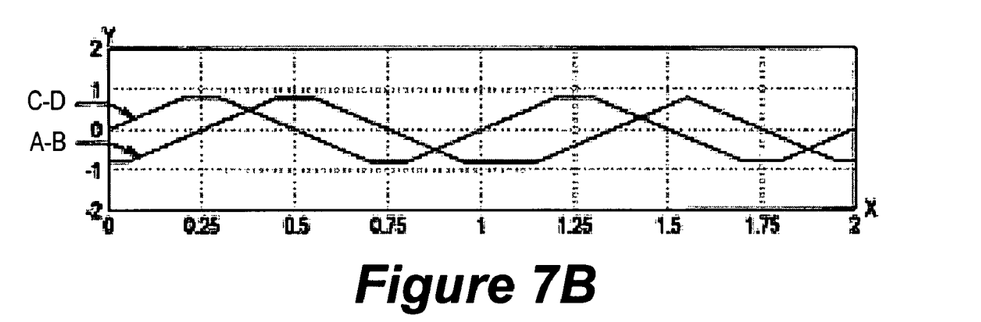
Figure 7C:
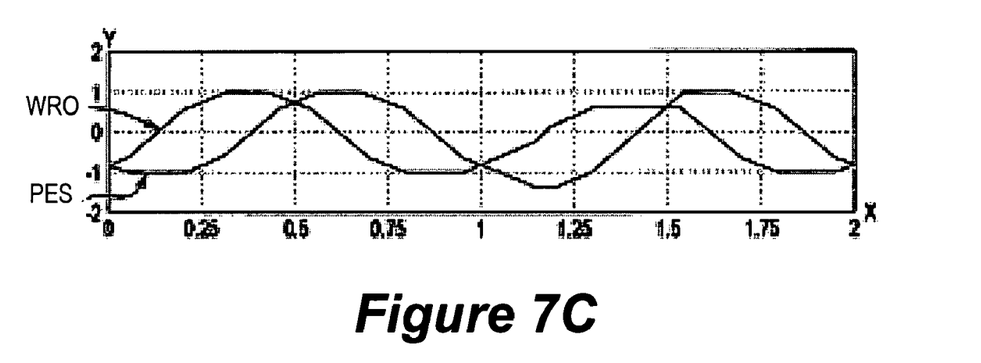

FIG. 7A shows plots of the signal values for the A, B, C and D bursts for a track with squeeze. The track has squeeze since the burst seam 43d (between the A and B bursts) is misplaced by 10% track width. FIG. 7B shows plots of the corresponding burst difference values A−B and C−D. FIG. 7C shows plots of the corresponding PES=[(A−B)−(C−D)]g and WRO=[(A−B)+(C−D)]g. In FIG. 6C the nominal and acceptable WRO is 1.0 for a track without squeeze, whereas in FIG. 7C the shifted position of the burst seam 43d causes the WRO to drop from 1.0 to 0.8, indicating squeeze.

In general, the calculation of ERC values may be a time consuming process, since it may require multiple disk revolutions per sector/track to obtain converged estimates. However, the number of revolutions required to obtain converged estimates may be different from track to track, depending on the characteristics of the servo fields written on the track. Some embodiments provide systems and/or methods that select a number of revolutions for ERC estimation for a track based on the burst-magnitude based WRO of the track.

Figure 8:
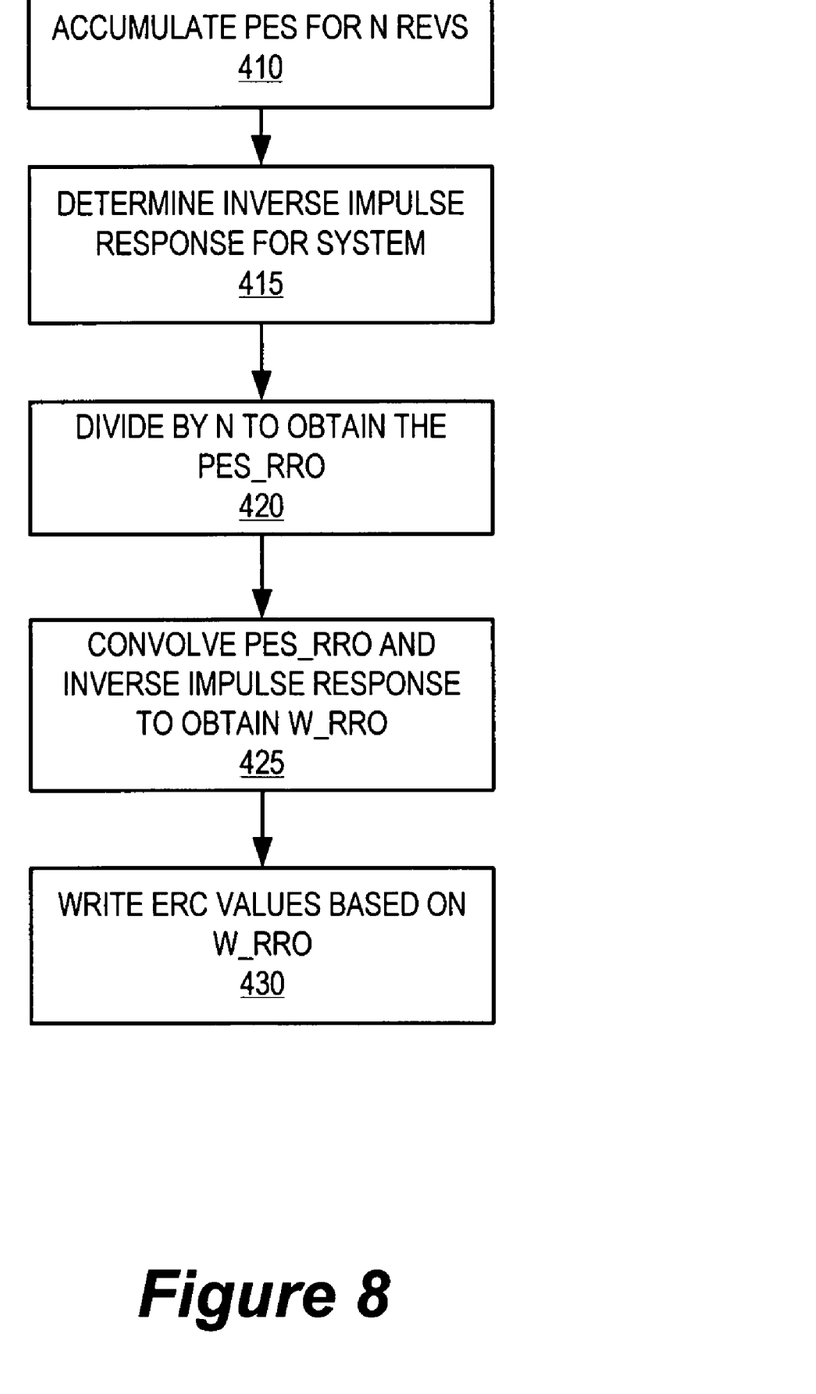
FIG. 8 is a flowchart showing non-iterative ERC calculations.
Figure 9:
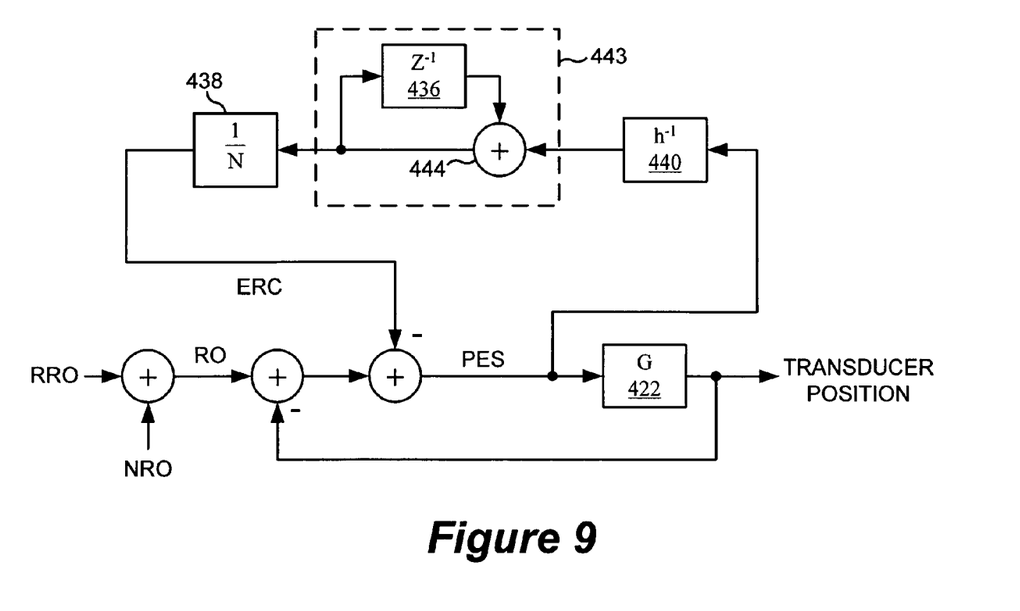
FIG. 9 is a block diagram illustrating systems/methods for non-iterative ERC calculation.

An open-loop technique for determining ERC values is illustrated in FIGS. 8 and 9, in which the ERC values are determined using a batch process. That is, a PES associated with each servo sector of a track is collected over many revolutions of the disk and then averaged to obtain the PES due to repeatable runout (PES_RRO). The PES_RRO is then circularly convolved with the inverse impulse response of the system to obtain the written in repetitive runout (WRO). The ERC values for the track are based on the WRO, and are generated once.

With reference to FIG. 8, in Block 410, when following a track, the PES is measured and summed for each of the servo bursts associated with the track for N revolutions of the disk.

In Block 415, the inverse impulse response for the disk drive is obtained. As will be understood by those skilled in the art, the inverse impulse response may be obtained in a variety of ways, including those described in the above-referenced U.S. Pat. Nos. 6,115,203 and 6,549,362. Furthermore, the inverse impulse response may be obtained for each transducer in a disk drive as described in U.S. Pat. No. 6,549,362.

Next, in Block 420, the PES_RRO is determined by dividing the sums by N to obtain the average PES associated with each of the servo bursts. As will be understood by those skilled in the art, the position error is averaged for N revolutions of the disk in an attempt to average-out the affects of NRRO. However, this is performed in an open-loop manner.

The average PES_RRO is circularly convolved with the inverse impulse response to obtain the W_RRO (Block 425). Finally, in Block 430, the ERC values are determined and written to the disk surface based upon the W_RRO.

Further systems and/or methods for determining ERC values are illustrated in the block diagram of FIG. 9. As shown therein, PES values may be circularly convolved with the inverse impulse response $h^{-1}$ of the system. The resulting RRO values are collected by an integrator 443 that includes a summation node 444 and a delay Block 436. The integrated RRO values are then divided by the number of revolutions, N, in Block 438. The resulting ERC values are used to correct the PES. As shown in FIG. 9, a PES signal is generated in response to runout RO, which is a combination of NRO and RRO. The PES is then multiplied by a gain G (Block 422) and used to control the position of the transducer 20.

Figure 10:
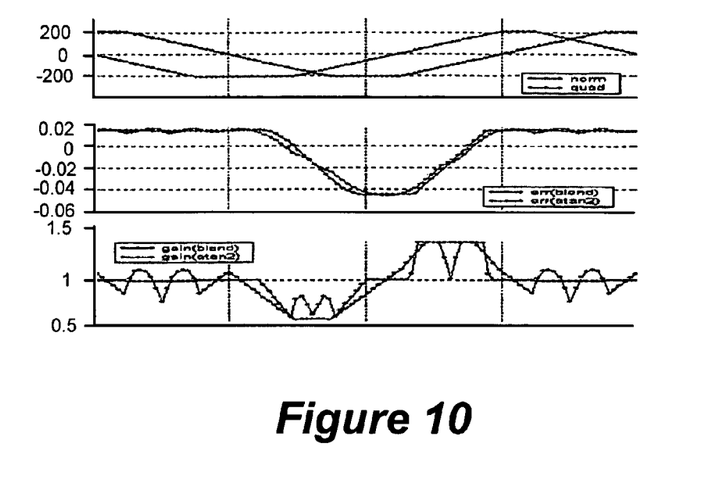
FIG. 10 is a graph of PES and WRO values, error function values and gain values for a track having improper spacing.

While the techniques illustrated in FIGS. 8 and 9 has its advantages, they, along with other open-loop techniques, have certain drawbacks. Specifically, an open-loop system cannot properly compensate for certain errors. For example, the open-loop system of FIGS. 8 and 9 cannot properly compensate for PES non-linearities (e.g., due to read asymmetry and other non-linear error sources), errors in modeling the inverse impulse response (e.g., gain error), and errors introduced into the system by NRRO (e.g., noise when writing the ERC values). This approach may also be subject to inaccuracies in the convolution kernel due to non-linearities in the position signal decoding scheme when there is track squeeze. The squeezed track may change the system gain, thus changing the shape of the error transfer function. For example, FIG. 10 illustrates changes in the system gain and error function as the head 20 traverses through a full cycle of burst quadrature in the presence of track squeeze.

Figure 11:
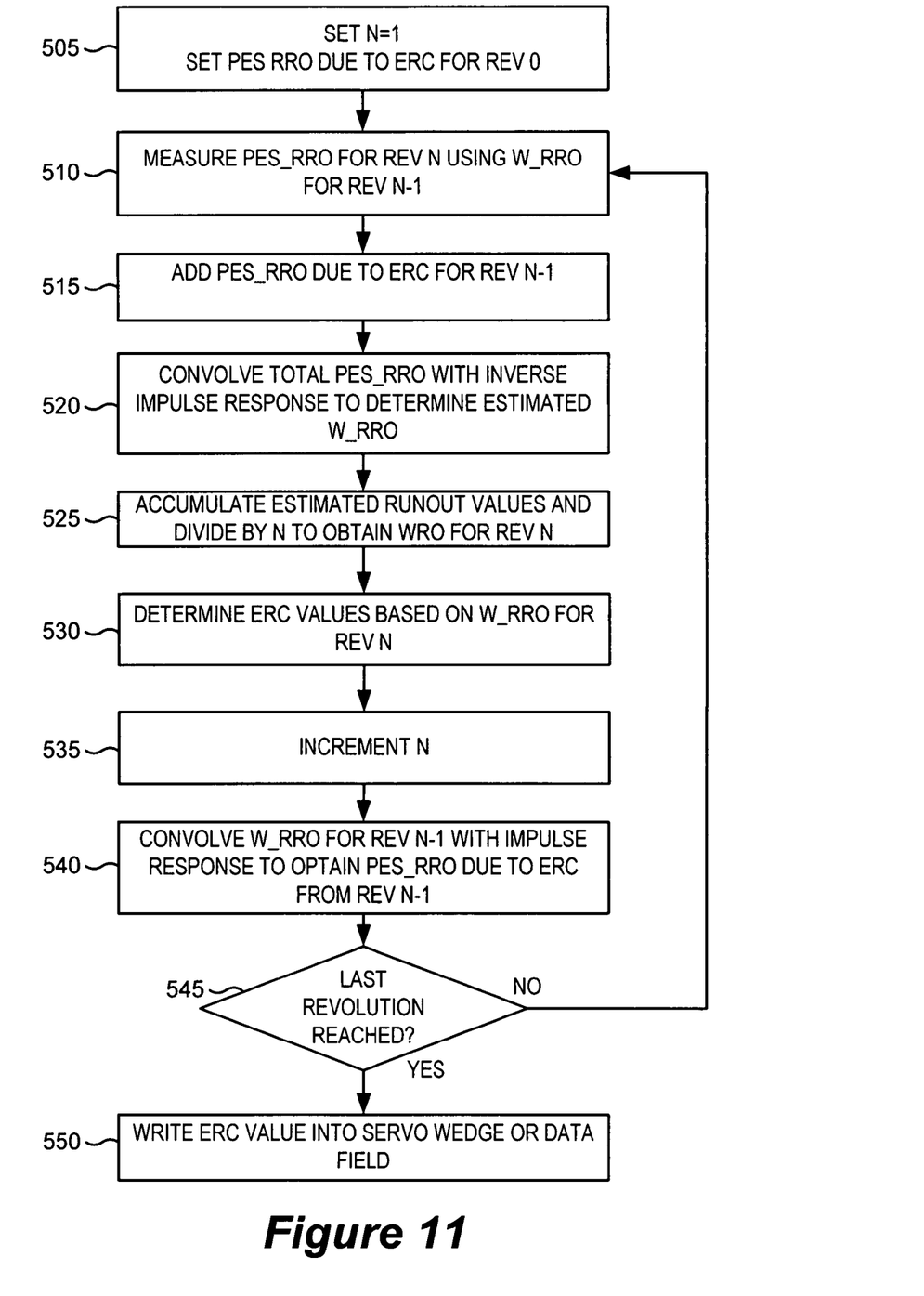
FIG. 11 is a flowchart showing iterative ERC calculations.
Figure 12:
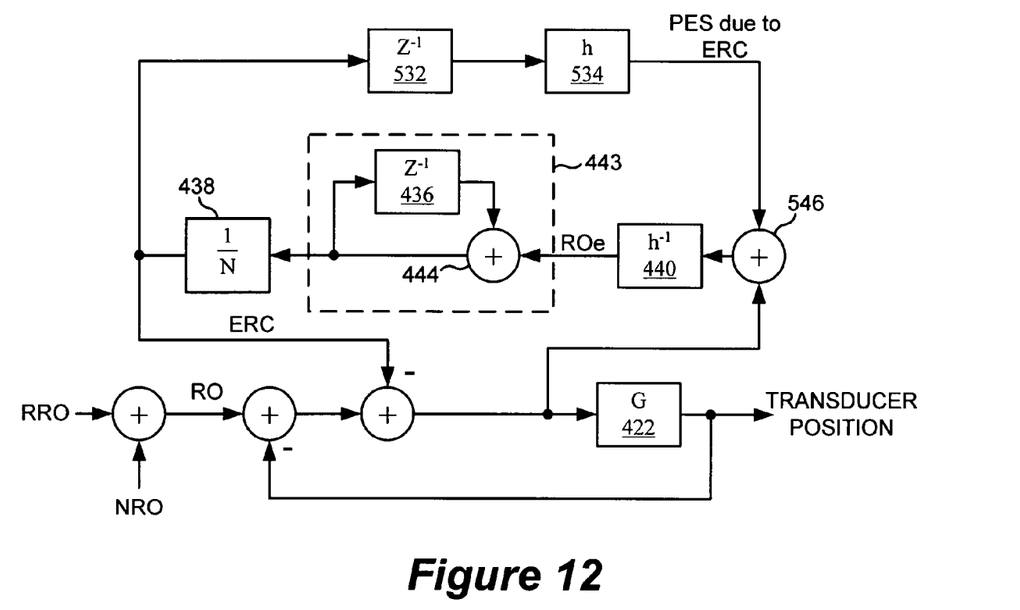
FIG. 12 is a block diagram illustrating systems/methods for iterative ERC calculation.

Accordingly, iterative systems/methods for determining ERC values are illustrated in FIGS. 11 and 12. In particular, FIGS. 11 and 12 are a flowchart and block diagram, respectively, that illustrate systems/methods for determining ERC values using feedback. Systems and/or methods for performing iterative ERC measurement are described in U.S. Pat. No. 7,106,547 to Hargarten et al. entitled "Method and Apparatus for Determining Embedded Runout Correction Values Using Feedback", the disclosure of which is incorporated herein by reference.

Referring to FIG. 11, when determining the ERC values, certain initial conditions must be set for the first revolution of the disk 34, as set forth in Block 505. More specifically, N (which represents the revolution of the disk 34 for which the ERC values are determined) is set to 1. Since no ERC was made in a prior revolution of the disk 34, the PES_RRO due to ERC is set to zero for the prior revolution (N−1) of the disk 34 and the accumulated estimated runout (Block 525 described below) is set to zero. Therefore, the PES_RRO due to ERC for revolution 0 of the disk 34 is set to 0. In practice, the ERC values may be initially set to zero in the disk drive 10.

In some embodiments, however, the initial ERC values for a track may be estimated from the ERC values of an adjacent track, plus the squeeze (AC and DC) between the tracks.

Next, in Block 510, the PES_RRO for revolution N of the disk 34 is determined by track following and measuring the position error associated with each servo sector 42a in the track 40. Subsequently, in Block 515, the PES_RRO due to ERC for the prior revolution (N−1) of the disk 34 is added to the values determined in Block 510 on a sector-by-sector basis, which results in a total PES_RRO that has values associated with each servo sector 42a of the track 40 being corrected. For N=1, the PES_RRO due to ERC is 0, as set forth in Block 505.

The inverse impulse response for the servo control system is obtained. U.S. Pat. No. 6,549,362 describes a method for determining the inverse impulse response for a servo control system by injecting or otherwise providing an impulse function into the servo control system and measuring the response of the servo control system. It should be understood that the present invention is not limited by the way the inverse impulse response of the servo control system is established.

A circular convolution of the total PES_RRO (Block 510) and the inverse impulse response of the servo control system is performed to obtain estimated W_RRO values associated with each servo sector 42a (Block 520), which are summed with all prior estimated runout values in an accumulator (Block 525). Then, the accumulated estimated runout values are divided by N, which results in the W_RRO for revolution N of the disk 34. ERC values are determined for the track 40 based upon the W_RRO for revolution N of the disk 34 and are electronically updated (Block 530).

In Block 535, the value of N is incremented by one in preparation for obtaining ERC values for a next revolution of the disk 34. The impulse response of the servo control system is determined. U.S. Pat. No. 6,549,362 describes a technique for obtaining the impulse response of a servo control system.

Then, in Block 540, the PES_RRO due to the ERC values from the prior revolution (N−1) of the disk 34 is obtained by convolving the W_RRO for the prior revolution (N−1) of the disk 34 with the impulse response of the servo control system.

After obtaining the ERC values from the prior revolution (N−1) of the disk 34 (Block 530), and obtaining the PES_RRO due to ERC from the prior revolution (N−1) of the disk 34 (Block 540), measurements are taken of the PES_RRO for revolution N of the disk 34, which now include updated ERC values (Block 530) that are, preferably, applied electronically (Block 510). Subsequently, in Block 515, the PES_RRO due to ERC for the prior revolution (N−1) of the disk 34, which was determined in Block 540, is added to obtain a total PES_RRO. The total PES_RRO is convolved with the inverse impulse response for the servo control system (Block 520) to obtain an estimated runout, which is summed with the results for the prior revolutions of the disk 34 and then divided by N to obtain the W_RRO for revolution N of the disk 34 (Block 525). The ERC values for the track 40 are calculated based on the W_RRO for revolution N of the disk 34 and are electronically updated on a sector-by-sector basis (Block 530).

In conventional techniques, the iterative process illustrated in FIGS. 11 and 12 may repeat until a decision is made that the total number of revolutions of the disk 34 for determining the ERC values with feedback has been met, or some other criteria has been satisfied (e.g., runout measurement, time spent on a track in question, etc.). Thus, in Block 545 a determination is made if the last revolution has been reached. If so, then in Block 550, the ERC values are written to the disk drive 10 (e.g., in the servo sectors 42A, data sectors 42b, in a look-up table, in memory, etc.). Otherwise, ERC calculation is performed for the next revolution.

FIG. 12 is a block diagram similar to the block diagram of FIG. 9, except that a feedback loop including a delay element 532, a convolution block 534 and a combiner 546 are included. In particular, the ERC values are delayed and convolved with the impulse response h of the system to obtain PES due to ERC, which is combined with the PES values as described above.

The feedback provided by the systems/methods described above forces errors (e.g., PES non-linearities, gain errors modeling the inverse impulse response (or plant), and errors introduced into the servo control system 144 by NRRO) to be driven to a null, assuming that the process has been repeated for a sufficient number of revolutions. However, the number of revolutions that may be required for the ERC values to converge may be different from track to track, depending on the amount of runout/squeeze associated with the track.

Figure 13A:
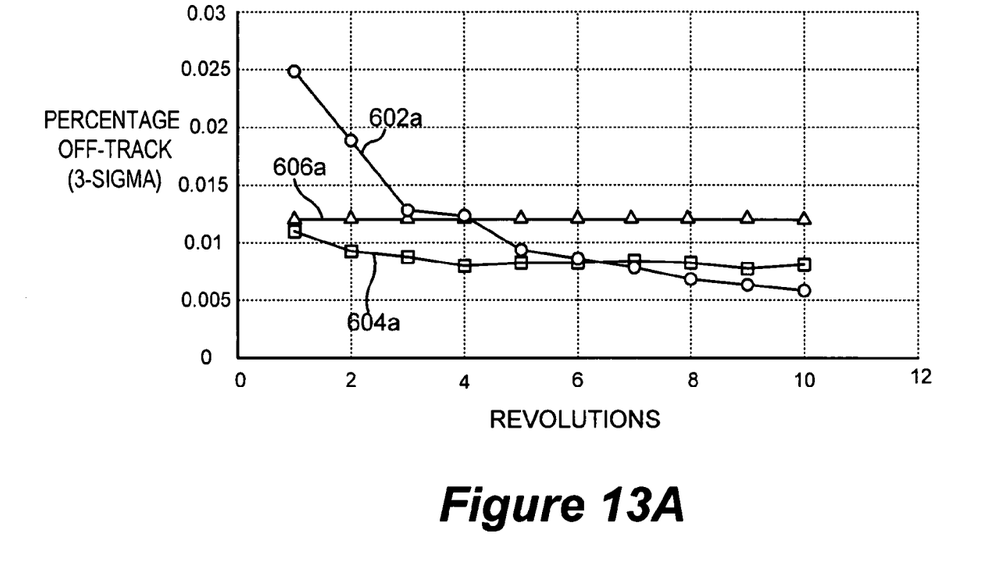
FIGS. 13A and 13B illustrate the effectiveness of ERC calculations on respective tracks for various numbers of revolutions.
Figure 13B:
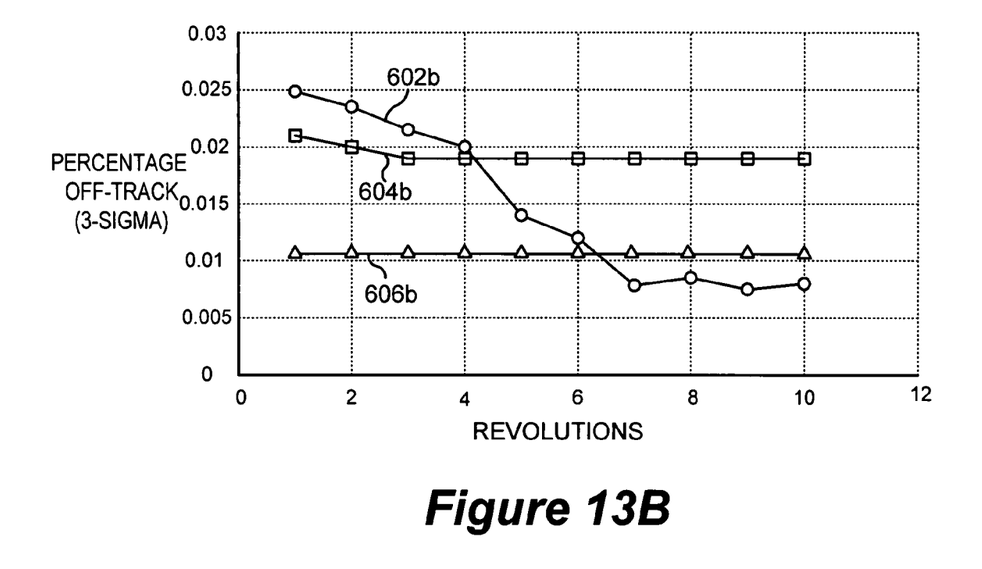

For example, FIGS. 13A and 13B illustrate the effectiveness of ERC calculations (by measuring RRO after applying ERC) on respective tracks for various numbers of revolutions. In FIGS. 13A and 13B, the percentage off track (3-sigma) is plotted for both iterative ($602a$, $602b$) and non-iterative ($604a$, $604b$) approaches. As can be seen from FIGS. 13A and 13B, the same number of revolutions of ERC correction may have a very different effect on different tracks that suffer from different levels of burst-misplacement. For example, the track associated with FIG. 13B needed seven revolutions of iterative ERC to achieve the same level of convergence as the track associated with FIG. 13A obtained with only five revolutions.

According to some embodiments, a number of revolutions for which ERC calculation is to be performed for a particular track is selected based on values of written-in runout (i.e. seam misplacement, or WRO) for the track. WRO may be calculated in a single revolution according to Equations 1a to 4b, above. Thus, in general, the number of revolutions (nRevs) for ERC calculation for a given track may be expressed as follows:

$$nRevs = f(WRO(1:nWedges)) \quad (5)$$

where nWedges represents the number of servo wedges in one revolution of the disk 34.

A number of different functions may be used to calculate nRevs. For example, in some embodiments, nRevs may be determined as a linear function of the maximum WRO of the track as follows:

$$nREvs = A*\max(WRO(1:nWedges)) \quad (6)$$

where A is a constant having a value selected to provide a desired level of confidence that convergence will occur within the chosen number of revolutions.

In some embodiments, nRevs may be selected from among a plurality of acceptable numbers based on the level of WRO for the track. For example, in some embodiments, nRevs may be determined as follows:

$$nRevs = \{R1, \text{ if } \max(WRO) > LIMIT;\ R2 \text{ if } \max(WRO) <= LIMIT\} \quad (7)$$

Accordingly, in some embodiments, if the maximum WRO value for the track is greater than a predetermined limit LIMIT, then the number of revolutions may be set to R1, and if the maximum WRO value for the track is less than or equal to LIMIT, the number of revolutions may be set to R2 where, for example, R2<R1.

In some embodiments, the number of revolutions may be determined in response to a certain percentage of WRO values for the track exceeding a limit. In further embodiments, the number of revolutions may be increased or decreased depending on both the magnitude and distribution of WRO values. In still further embodiments, the number of revolutions may be determined in response to the average of WRO values for the track. Other functions may be used, including combinations and/or extensions of the foregoing.

Figure 14:
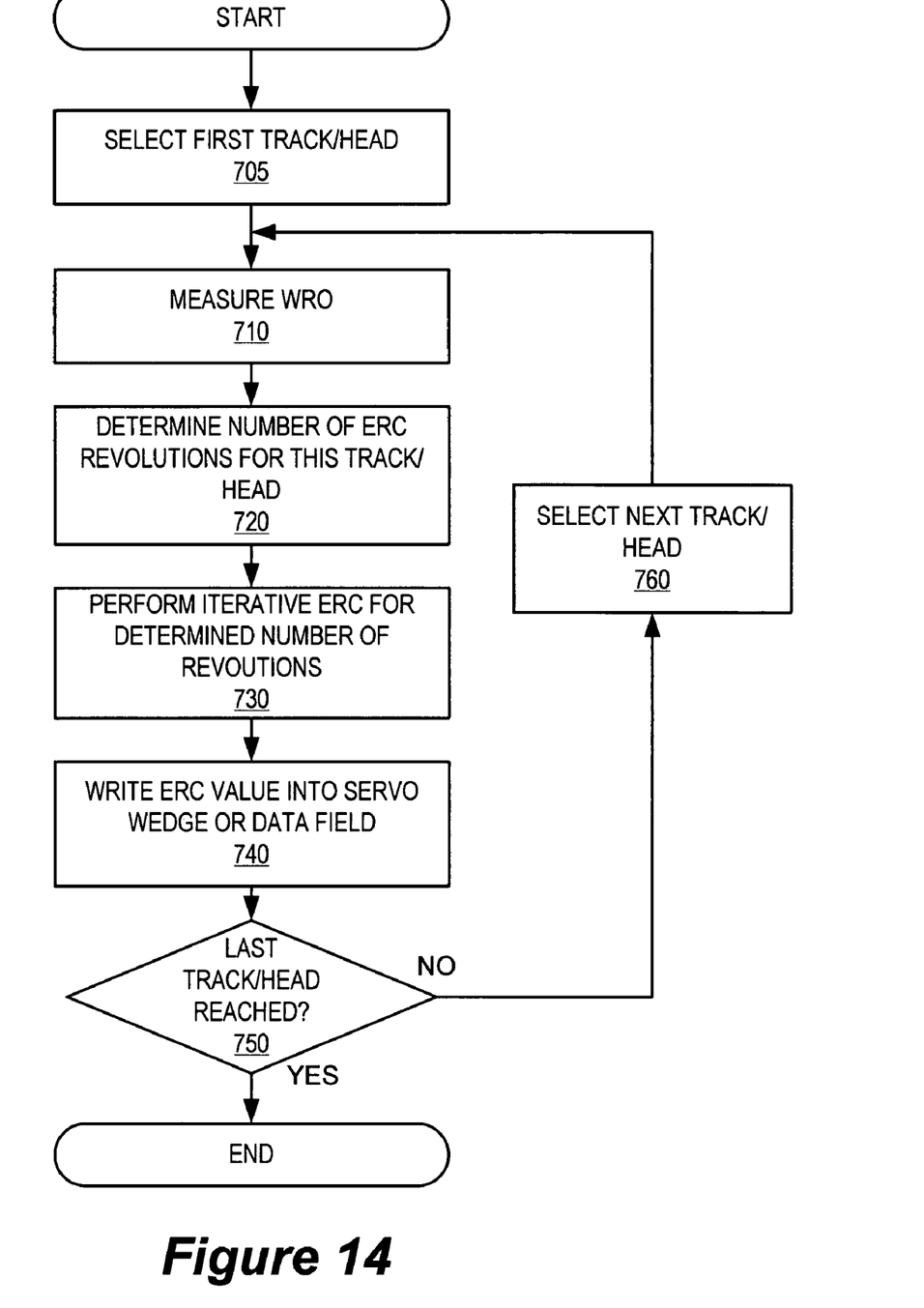
FIGS. 14 and 15 are flowcharts illustrating systems and/or methods according to some embodiments.

Accordingly, embodiments are illustrated in the flowchart of FIG. 14. The operations illustrated in FIG. 14 may be performed, for example, by a controller circuit in the disk drive electronics. Referring to FIG. 14, a first track/head is selected (Block 705). The written-in run out (WRO) is measured for the selected track (Block 710). The number of ERC revolutions to be performed for this track/head is then determined, for example, in response to the measured WRO of the track (Block 720).

Iterative ERC is then performed for the track for the determined number of revolutions (Block 730). The ERC value determined in Block 730 is then written into a server wedge and/or a data field (Block 740). The controller then checks to determine if the last track/head has been processed (Block 750). If not, the controller selects the next track/head and performs ERC calculation thereon (Block 760). Otherwise, operations terminate.

Because seam misplacement may propagate from track to track, a given track may have a small WRO but may still have a large amount of runout. Accordingly, in some embodiments, WRO may be measured and evaluated over a number of tracks. A statistical decision may be made about the number of revolutions that ERC should be performed for the tracks based on the average or maximum WRO values for the tracks.

Figure 15:
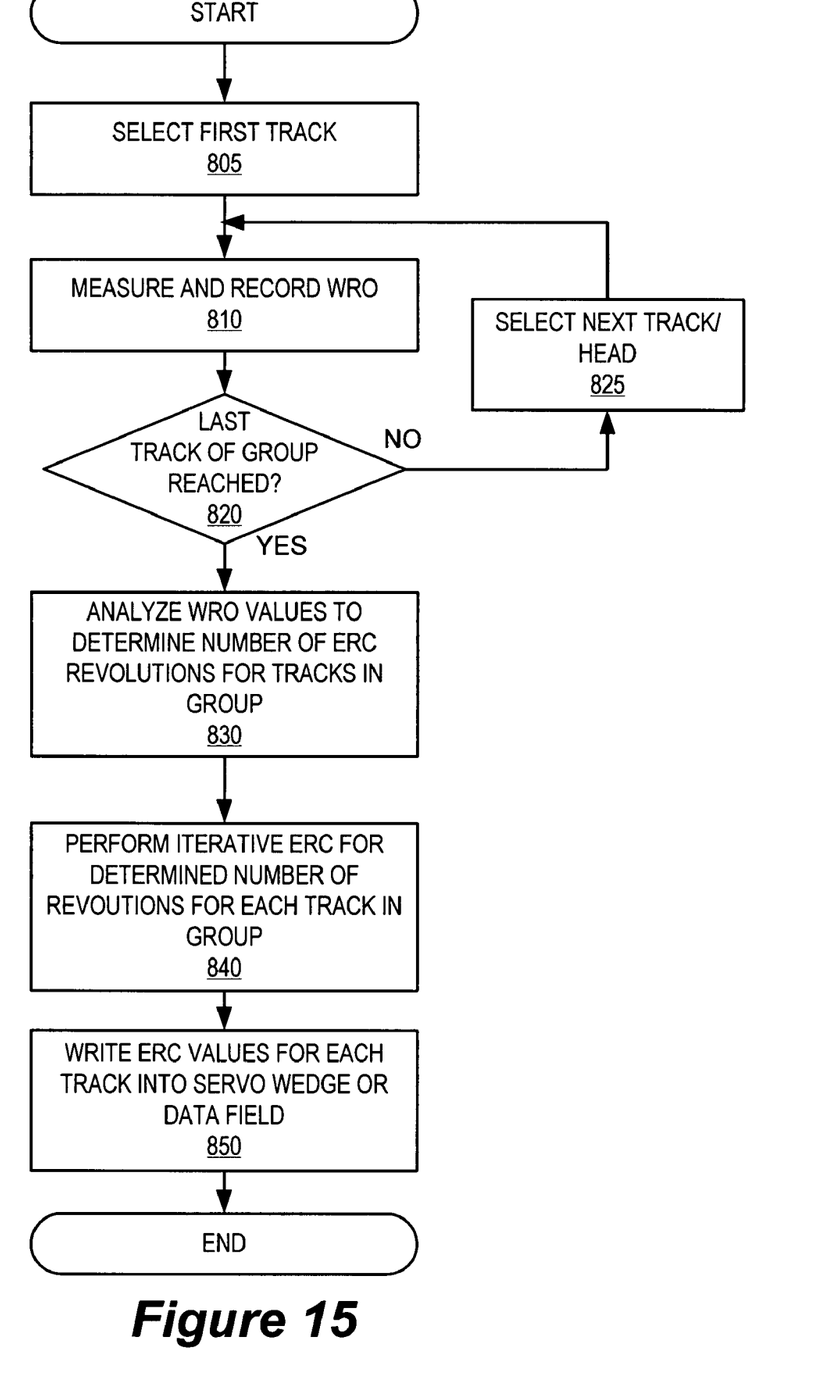

Accordingly, some embodiments are illustrated in the flowchart of FIG. 15. In Block 805, a first track is selected. The written-in run out (WRO) of the selected track is measured and recorded (Block 810). This process is repeated for each track in a group of tracks by checking to see if the last track has been reached (Block 820), and, if not, selecting the next track (Block 825) and performing WRO measurement thereon.

The WRO values recorded for the tracks are then statistically analyzed to determine the number of ERC revolutions that should be used for tracks in the group of tracks (Block 830). For example, a statistical metric, such as an average WRO value for the tracks, may be generated and used to determine the number of ERC revolutions to use.

Iterative ERC is then performed for the tracks for the determined number of revolutions (Block 840). The ERC value determined in Block 840 is then written into a server wedge and/or a data field (Block 850).

Some embodiments may decrease the amount of time required to perform ERC calculations. In particular, the time required to perform ERG calculations may be reduced while maintaining a desired reduction of RRO effects.

In many cases the number of tracks that require higher numbers of revolutions to obtain accurate ERC values is relatively small. Thus, if the same number of revolutions is used for every track, then an unnecessarily large number of revolutions will be used for many of the tracks. Assuming that 4% of tracks on a disk require 8 revolutions for ERC convergence while the remaining tracks require only 5 revolutions, then the extra revolutions required to perform adequate ERC calculation would increase the calculation time by only about 2% (due to 3 extra revolutions for 4% of the tracks). In contrast, if 8 revolutions were used instead of 5 revolutions for every track, the amount of time required for ERC calculation would be increased by 60%.

In some cases, WRO values may be recorded and restored on to disk 34, to be use later with the ERC calculation. For example, during manufacturing and/or testing, WRO values for each track may be recorded, and maybe use during ERC calculation at a later time.

In some embodiments, other aspects of the disk drive may be modified based on WRO measurements. For example, the kernel gain may be adjusted based on the WRO measurement. The WRO DC gain (which is cumulative between ERC locations) may be used to adjust the kernel. If the squeeze is too high, the iterative or adaptive gain ERC may become unstable. Reducing the kernel gain (along with increased revolutions) in the presence of high WRO can be used to promote stability.

Furthermore, in some embodiments, the kernel gain can be selectively reduced at certain frequencies depending on the WRO energy at that frequency.

Although embodiments of the invention are described in connection with circular tracks on rotational data storage disks, it will be appreciated that some embodiments may be implemented in connection with other types of tracks, including linear tracks, and/or in connection with other types of storage media besides rotatable disks. Thus, for example, ERC calculation may be performed for a given number of passes over a track instead of for a given number of rotations of a data storage disk.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method comprising:
   measuring written-in runout for a track of a rotational data storage disk;
   selecting a number of disk revolutions in response to the measured written-in runout of the track;
   calculating embedded correction values for the track for the selected number of disk revolutions;
   storing the embedded correction values; and
   adjusting a kernel gain of a servo control system including the data storage disk in response to the written-in runout of the track.

2. The method of claim 1, wherein measuring written-in runout comprises measuring written-in runout values for a plurality of tracks, and wherein selecting a number of disk revolutions comprises selecting a number of disk revolutions to be used for a track in the plurality of tracks in response to the measured written-in runout values for the plurality of tracks.

3. The method of claim 2, further comprising generating a statistical metric of the measured written-in runout values for the plurality of tracks, wherein selecting a number of disk revolutions comprises selecting a number of disk revolutions to be used for a track in the plurality of tracks in response to the statistical metric.

4. The method of claim 1, wherein calculating the embedded correction values comprises performing iterative embedded correction calculation for the selected number of disk revolutions.

5. The method of claim 1, wherein measuring the written-in runout of the track comprises reading servo burst signal values from the track, generating burst difference signal values from the servo burst signal values, and determining written-in runout values from the burst signal difference values.

6. The method of claim 5, wherein the written-in runout values are calculated according to one of the following equations:

$$WRO1 = f[(A-B)+(C-D)]$$

$$WRO2 = f[(A-B)-(C-D)]$$

$$WRO3 = f[(A-B)-(C-D)]$$

$$WRO4 = f[(A-B)+(C-D)]$$

wherein $f[\ ]$ denotes a function and wherein A, B, C and D comprise servo burst magnitudes.

7. The method of claim 1, wherein the number of disk revolutions is determined as a function of the maximum written-in runout of the track.

8. The method of claim 7, wherein the number of disk revolutions is determined according to the following equation:

$$nRevs = A * \max(WRO(1{:}nWedges))$$

where nRevs represents the number of revolutions, A is a constant, WRO represents the written-in runout measurements of the track, and nWedges represents a number of servo wedges on the track.

9. The method of claim 1, wherein the number of disk revolutions is determined as a first number of revolutions if the maximum written-in runout of the track is greater than a predetermined limit and a second number of revolutions if the maximum written-in runout of the track is less than the predetermined limit.

10. The method of claim 1, wherein the number of disk revolutions is selected in response to a predetermined percentage of written-in runout values for the track exceeding a limit.

11. The method of claim 1, wherein the number of disk revolutions is determined in response to an average of written-in runout values for the track.

12. The method of claim 1, wherein adjusting the kernel gain comprises reducing the kernel gain in response to a high level of written-in runout for the track.

13. The method of claim 1, wherein storing the embedded correction values comprises storing the embedded correction values in servo sectors on the data storage disk.

14. The method of claim 1, wherein storing the embedded correction values comprises storing the embedded correction values in data sectors on the data storage disk and/or storing the embedded correction values in a memory.

15. A method comprising:
    measuring written-in runout within servo control fields in a servo control system;
    selecting a number of passes in response to the measured written-in runout;
    calculating embedded correction values for the selected number of passes; and
    storing the embedded correction values; and
    adjusting a kernel gain of the servo control system in response to the written-in runout.

16. The method of claim 15, wherein measuring written-in runout comprises measuring written-in runout values for a plurality of adjacent tracks, and wherein selecting a number of disk revolutions comprises selecting a number of passes to be used for a track in the plurality of tracks in response to the measured written-in runout values for the plurality of tracks.

17. The method of claim 16, further comprising generating a statistical metric of the measured written-in runout values for the plurality of tracks, wherein selecting a number of passes comprises selecting a number of passes to be used for a track in the plurality of tracks in response to the statistical metric.

18. The method of claim 15, wherein the number of passes is determined as a function of the maximum written-in runout within the servo control fields.

19. The method of claim 15, wherein the number of passes is determined as a first number of passes if the maximum written-in runout is greater than a predetermined limit and a second number of passes if the maximum written-in runout is less than or equal to the predetermined limit.

20. The method of claim 15, wherein the number of passes is selected in response to a predetermined percentage of written-in runout values within the servo control fields exceeding a limit.

21. The method of claim 15, wherein the number of passes is determined in response to an average of written-in runout values for the servo control fields.

* * * * *